(12) United States Patent
Archer et al.

(10) Patent No.: US 8,095,811 B2
(45) Date of Patent: Jan. 10, 2012

(54) REDUCING POWER CONSUMPTION WHILE SYNCHRONIZING A PLURALITY OF COMPUTE NODES DURING EXECUTION OF A PARALLEL APPLICATION

(75) Inventors: Charles J. Archer, Rochester, MN (US); Michael A. Blocksome, Rochester, MN (US); Amanda A. Peters, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/129,223

(22) Filed: May 29, 2008

(65) Prior Publication Data

US 2009/0300385 A1 Dec. 3, 2009

(51) Int. Cl.
G06F 1/26 (2006.01)
(52) U.S. Cl. .......................................... 713/320; 712/30
(58) Field of Classification Search .................. 713/320, 713/323–324, 375; 712/28–30
See application file for complete search history.

(56) References Cited

U.S. PATENT DOCUMENTS

| 7,281,146 | B2 | 10/2007 | Nalawadi et al. |
| 7,284,137 | B2 | 10/2007 | Clark et al. |
| 7,305,569 | B2 | 12/2007 | Reilly |
| 7,716,500 | B2 | 5/2010 | Esliger |
| 2004/0153867 | A1 | 8/2004 | McAlinden et al. |
| 2005/0055590 | A1 | 3/2005 | Farkas et al. |
| 2005/0177327 | A1 | 8/2005 | Banginwar et al. |
| 2006/0253507 | A1 | 11/2006 | Schank et al. |
| 2006/0282838 | A1 | 12/2006 | Gupta et al. |
| 2007/0005998 | A1 | 1/2007 | Jain et al. |
| 2007/0033367 | A1 | 2/2007 | Sakarda et al. |
| 2007/0067657 | A1 | 3/2007 | Ranganathan et al. |
| 2007/0300083 | A1 | 12/2007 | Goodrum et al. |
| 2008/0178029 | A1 | 7/2008 | McGrane et al. |
| 2008/0228462 | A1 | 9/2008 | Gross et al. |
| 2008/0234873 | A1 | 9/2008 | Gorbatov et al. |
| 2008/0313482 | A1 | 12/2008 | Karlapalem et al. |
| 2009/0024819 | A1 | 1/2009 | Fisher et al. |
| 2009/0187658 | A1 | 7/2009 | Williams et al. |
| 2009/0265568 | A1 | 10/2009 | Jackson |

OTHER PUBLICATIONS

Office Action, U.S. Appl. No. 12/127,035, Jan. 5, 2011.
Office Action, U.S. Appl. No. 12/135,593, Mar. 30, 2011.
Office Action, U.S. Appl. No. 12/129,334, May 29, 2008.
Office Action, U.S. Appl. No. 12/129,205, May 29, 2008.

*Primary Examiner* — Clifford Knoll
(74) *Attorney, Agent, or Firm* — Biggers & Ohanian LLP

(57) ABSTRACT

Methods, apparatus, and products are disclosed for reducing power consumption while synchronizing a plurality of compute nodes during execution of a parallel application that include: beginning, by each compute node, performance of a blocking operation specified by the parallel application, each compute node beginning the blocking operation asynchronously with respect to the other compute nodes; reducing, for each compute node, power to one or more hardware components of that compute node in response to that compute node beginning the performance of the blocking operation; and restoring, for each compute node, the power to the hardware components having power reduced in response to all of the compute nodes beginning the performance of the blocking operation.

20 Claims, 7 Drawing Sheets

REDUCING POWER CONSUMPTION WHILE SYNCHRONIZING A PLURALITY OF COMPUTE NODES DURING EXECUTION OF A PARALLEL APPLICATION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for reducing power consumption while synchronizing a plurality of compute nodes during execution of a parallel application.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes'. A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh', for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

As mentioned above, compute nodes connected through such data communications operate to process parallel applications. Each compute node typically processes its own set of data according to a parallel algorithm specified by the parallel application. Because each compute node processes data independently, some compute nodes may process instructions faster or slower than other compute nodes. The compute nodes that process instructions faster than other compute nodes tend to be processing data according to the parallel algorithm at a point further along in the execution sequence than the other compute nodes. The compute nodes that process instructions slower than other compute nodes tend to be processing data at a point in the execution sequence that trails the other compute nodes. Because a particular portion of a parallel algorithm often requires that all of the compute nodes begin processing the particular portion at the same time, such a parallel algorithm may specify that all of the compute nodes be synchronized before processing that particular portion of the algorithm. To synchronize a set of compute nodes, software designers often use a barrier operation. A barrier operation for a set of compute nodes prevents each compute node from processing beyond a particular point in a parallel algorithm until all of the other compute nodes reach the same point in the algorithm. A barrier operation may be implemented using, for example, the MPI_BARRIER function described in the Message Passing Interface ('MPI') specification that is promulgated by the MPI Forum. Because a barrier operation forces most of the compute nodes in a particular set to wait for the slowest compute nodes before processing of the parallel algorithm may continue, significant amounts of power are often wasted by compute nodes that idle while waiting for the slowest compute nodes to complete the barrier operation.

In addition to a barrier operation, there are other circumstances in which one or more compute nodes idly wait for processing to complete on another compute node before continuing data processing along an application's execution sequence. When an application executing on a plurality of compute nodes instructs one of the compute nodes to perform I/O operations, often the remaining nodes do not continue processing the application until the singular node completes performance of the I/O operations. As with the barrier operation, the remaining nodes waste significant amounts of power while waiting for the singular node to complete performance of the I/O operations.

SUMMARY OF THE INVENTION

Methods, apparatus, and products are disclosed for reducing power consumption while synchronizing a plurality of compute nodes during execution of a parallel application that include: beginning, by each compute node, performance of a blocking operation specified by the parallel application, each compute node beginning the blocking operation asynchronously with respect to the other compute nodes; reducing, for each compute node, power to one or more hardware components of that compute node in response to that compute node beginning the performance of the blocking operation; and restoring, for each compute node, the power to the hardware components having power reduced in response to all of the compute nodes beginning the performance of the blocking operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
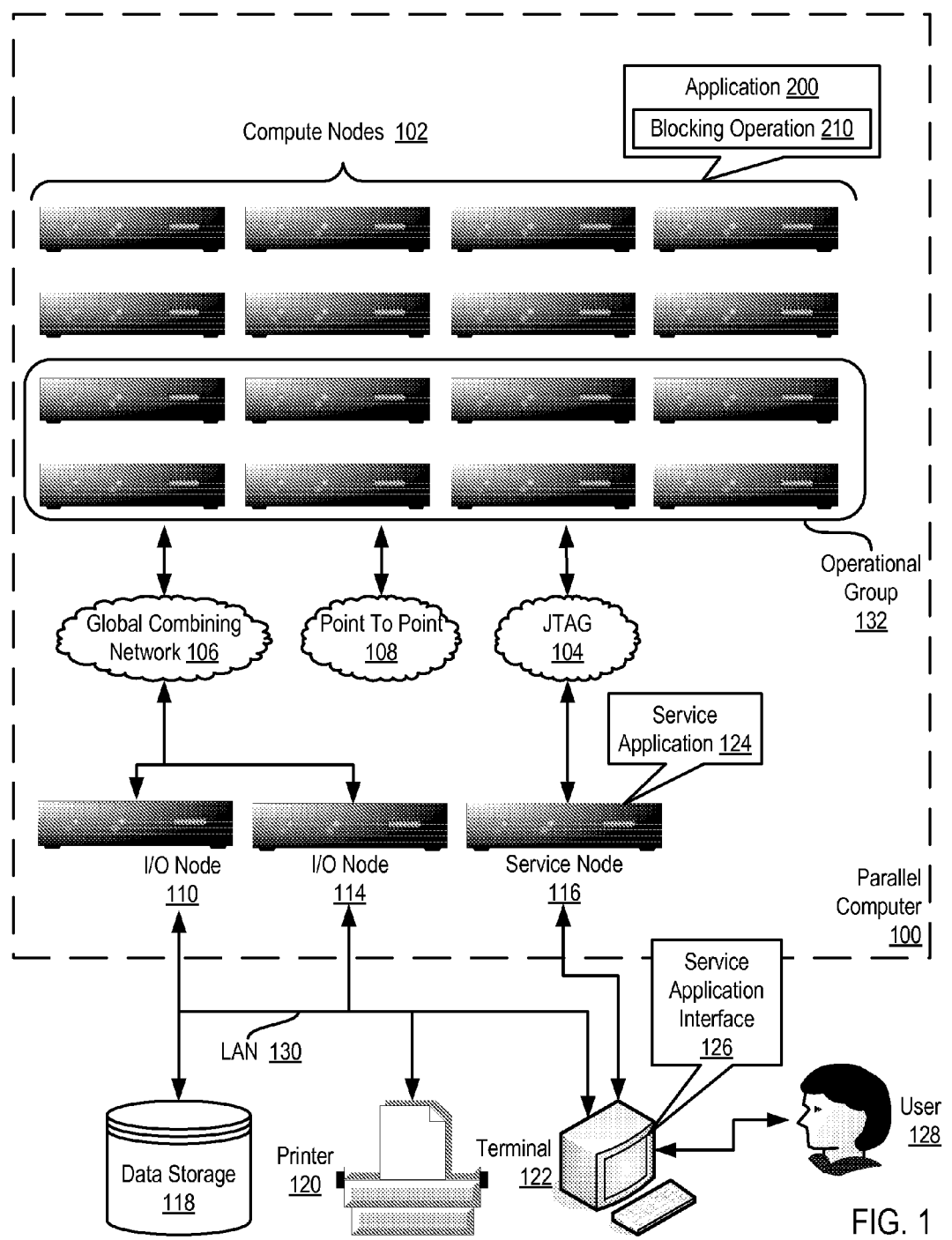
FIG. 1 illustrates an exemplary system for reducing power consumption while synchronizing a plurality of compute nodes during execution of a parallel application according to embodiments of the present invention.

Exemplary methods, apparatus, and computer program products for reducing power consumption while synchronizing a plurality of compute nodes during execution of a parallel application according to embodiments of the present invention are described with reference to the accompanying drawings, beginning with FIG. 1. FIG. 1 illustrates an exemplary system for reducing power consumption while synchronizing a plurality of compute nodes during execution of a parallel application (100) according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

In the example of FIG. 1, the compute nodes (102) operate to execute a parallel application (200) that specifies a blocking operation (210) for execution on one or more of the compute nodes (102). The blocking operation (210) of FIG. 1 is an operation that prevents the compute nodes from executing the application (200) beyond a particular point of the application's execution sequence until criteria specified by the blocking operation (210) is satisfied. The blocking operation (210) of FIG. 1 may be implemented as a barrier operation, an I/O operation, or in any other manner as will occur to those of skill in the art. An I/O operation performed by a particular compute node may prevent other compute nodes from executing the application (200) beyond a particular point of the application's execution sequence until those other compute nodes are notified that the I/O operation is complete. A barrier operation is an operation that prevents a particular compute node from executing the application (200) beyond a particular point of the application's execution sequence until all of the other compute nodes executing the application having reached the same point in the execution sequence of the application. A barrier operation may be implemented using, for example, the MPI_BARRIER function described in the MPI specification that is promulgated by the MPI Forum.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator'.

'MPI' refers to 'Message Passing Interface', a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank'. After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the exemplary system of FIG. 1, each compute node (102) includes a set of computer program instructions capable of reducing power consumption while synchronizing the plurality of compute nodes (102) during execution of a parallel application (200) according to embodiments of the present invention. Each compute node (102) operates generally for reducing power consumption while synchronizing a plurality of compute nodes (102) during execution of a parallel application (200) according to embodiments of the present invention by: beginning performance of a blocking operation (210) specified by the parallel application (200), each compute node beginning the blocking operation (210) asynchronously with respect to the other compute nodes (102); reducing power to one or more hardware components of that compute node (102) in response to that compute node (102) beginning the performance of the blocking operation (210); and restoring the power to the hardware components having power reduced in response to all of the compute nodes (102) beginning the performance of the blocking operation (210).

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although reducing power consumption while synchronizing a plurality of compute nodes during execution of a parallel application according to embodiments of the present invention is described above in terms of an architecture for a parallel computer, readers will note that such an embodiment is for explanation only and not for limitation. In fact, reducing power consumption while synchronizing a plurality of compute nodes during execution of a parallel application according to embodiments of the present invention may be implemented using a variety of computer system architectures composed of a plurality of nodes network-connected together, including for example architectures for a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of reducing power consumption while synchronizing a plurality of compute nodes during execution of a parallel application according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of reducing power consumption while synchronizing a plurality of compute nodes during execution of a parallel application according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Reducing power consumption while synchronizing a plurality of compute nodes during execution of a parallel application according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of executing an application according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152).

Figure 2:
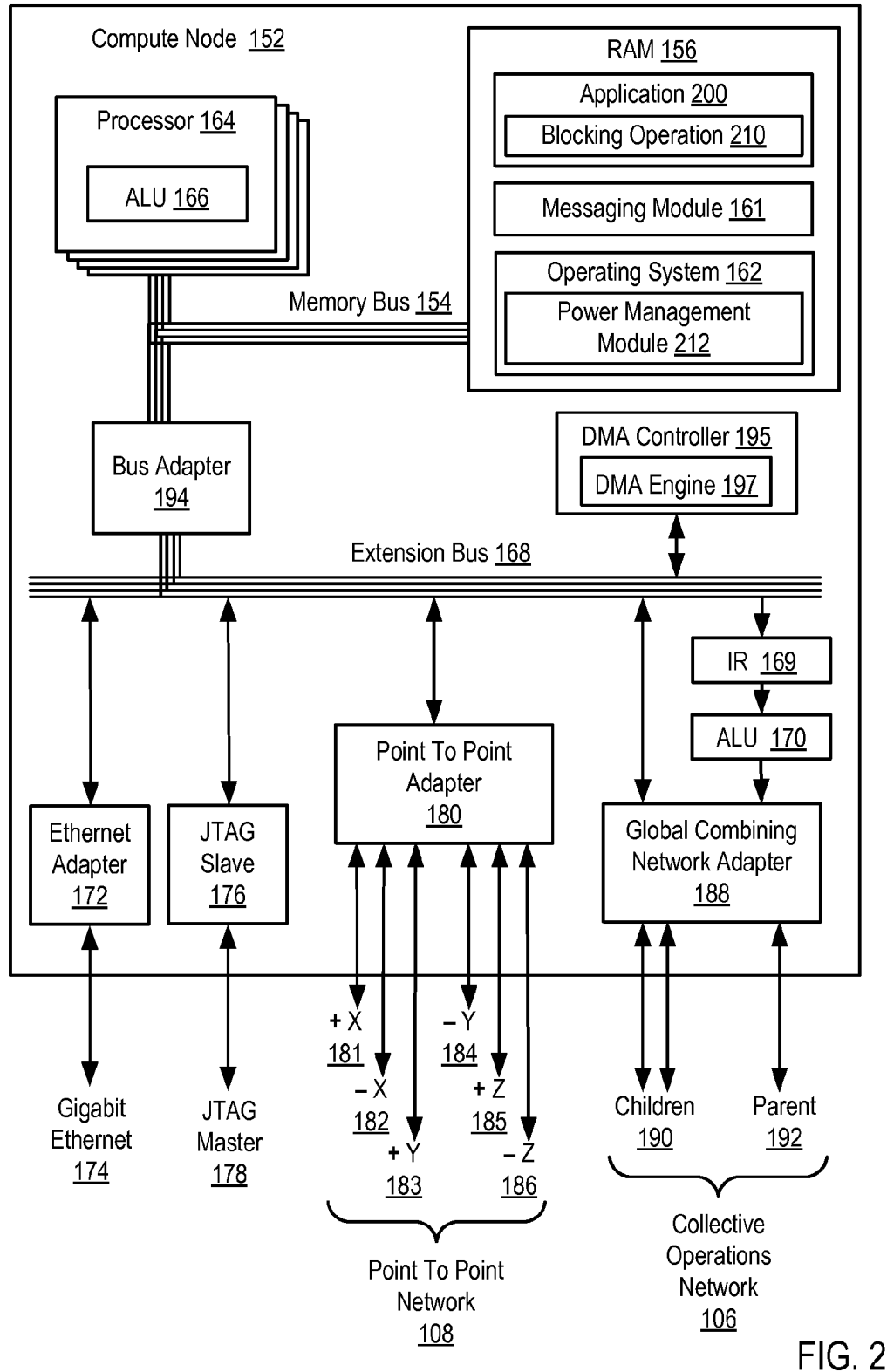
FIG. 2 sets forth a block diagram of an exemplary compute node useful in a parallel computer capable of reducing power consumption while synchronizing a plurality of compute nodes during execution of a parallel application according to embodiments of the present invention.

Stored in RAM (156) of FIG. 2 is a parallel application (200). The parallel application (200) is a set of computer program instructions that provide user-level data processing. The parallel application (200) of FIG. 2 specifies a blocking operation (210) for execution on one or more compute nodes. The blocking operation (210) of FIG. 2 is an operation that prevents the compute nodes from executing the application (200) beyond a particular point of the application's execution sequence until criteria specified by the blocking operation (210) is satisfied. The blocking operation (210) of FIG. 2 may be implemented as a barrier operation, an I/O operation, or in any other manner as will occur to those of skill in the art.

Also stored RAM (156) is a messaging module (161), a library of computer program instructions that carry out parallel communications among compute nodes, including point to point operations as well as collective operations. User-level applications such as tasks (210) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface'('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, LINUX™, MICROSOFT VISTA™, AIX™, IBM's i5/OS™, and others as will occur to those of skill in the art.

The operating system (162) includes a power management module (212). The power management module (212) is a service of the operating system (162) that manages the power provided and consumed by the hardware components of the compute node (162). The power management module (212) may manage power for the hardware components by controlling the processor (164) or a service processor (not shown) that connects to each of the hardware components. Such connections may be implemented using the buses (154, 168) illustrated in FIG. 2 or through out of band buses (not shown) such as, for example, an Inter-Integrated Circuit ('I2C') bus, a JTAG network, a System Management Bus ('SMBus'), and so on.

The power management module (212) of FIG. 2 includes a set of computer program instructions capable of reducing power consumption while synchronizing the plurality of compute nodes during execution of the parallel application (200) according to embodiments of the present invention. The power management module (212) of FIG. 2 operates generally for reducing power consumption while synchronizing a plurality of compute nodes during execution of a parallel application (200) according to embodiments of the present invention by: beginning performance of a blocking operation (210) specified by the parallel application (200), the compute node (152) beginning the blocking operation (210) asynchronously with respect to the other compute nodes; reducing power to one or more hardware components of that compute node in response to that compute node beginning the performance of the blocking operation (210); and restoring the power to the hardware components having power reduced in response to all of the compute nodes beginning the performance of the blocking operation (210).

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for reducing power consumption while synchronizing a plurality of compute nodes during execution of a parallel application according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in reducing power consumption while synchronizing a plurality of compute nodes during execution of a parallel application according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or', for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
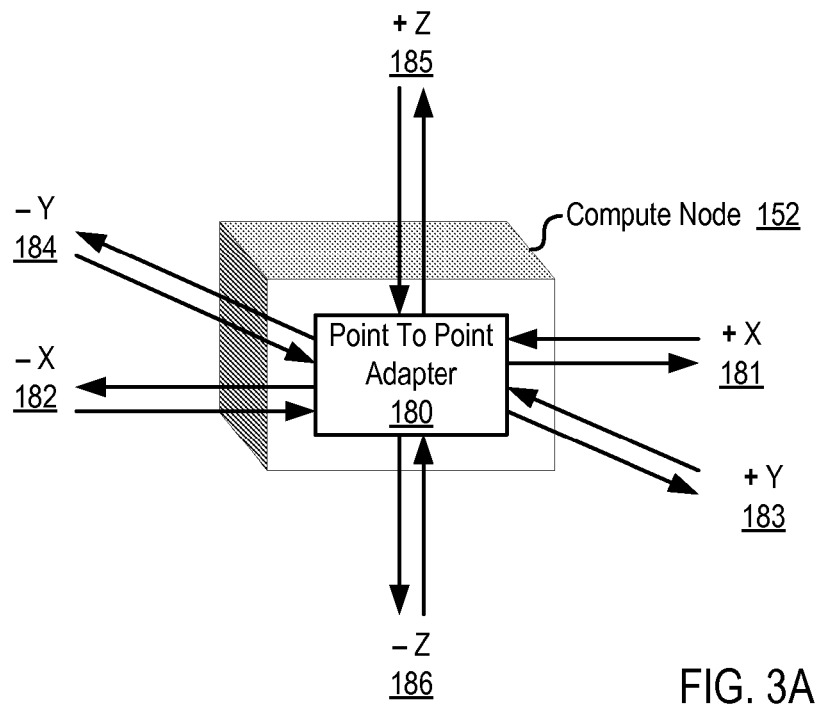
FIG. 3A illustrates an exemplary Point To Point Adapter useful in systems capable of reducing power consumption while synchronizing a plurality of compute nodes during execution of a parallel application according to embodiments of the present invention.

For further explanation, FIG. 3A illustrates an exemplary Point To Point Adapter (180) useful in systems capable of reducing power consumption while synchronizing a plurality of compute nodes during execution of a parallel application according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
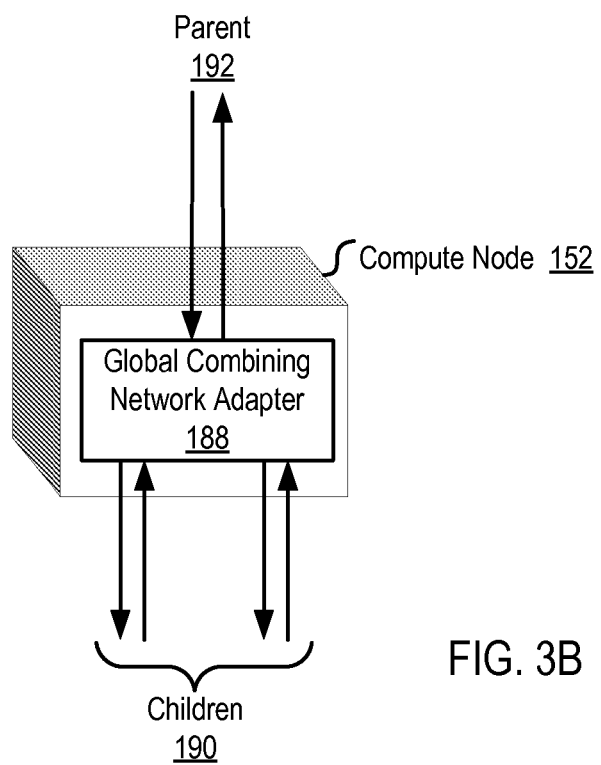
FIG. 3B illustrates an exemplary Global Combining Network Adapter useful in systems capable of reducing power consumption while synchronizing a plurality of compute nodes during execution of a parallel application according to embodiments of the present invention.

For further explanation, FIG. 3B illustrates an exemplary Global Combining Network Adapter (188) useful in systems capable of reducing power consumption while synchronizing a plurality of compute nodes during execution of a parallel application according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
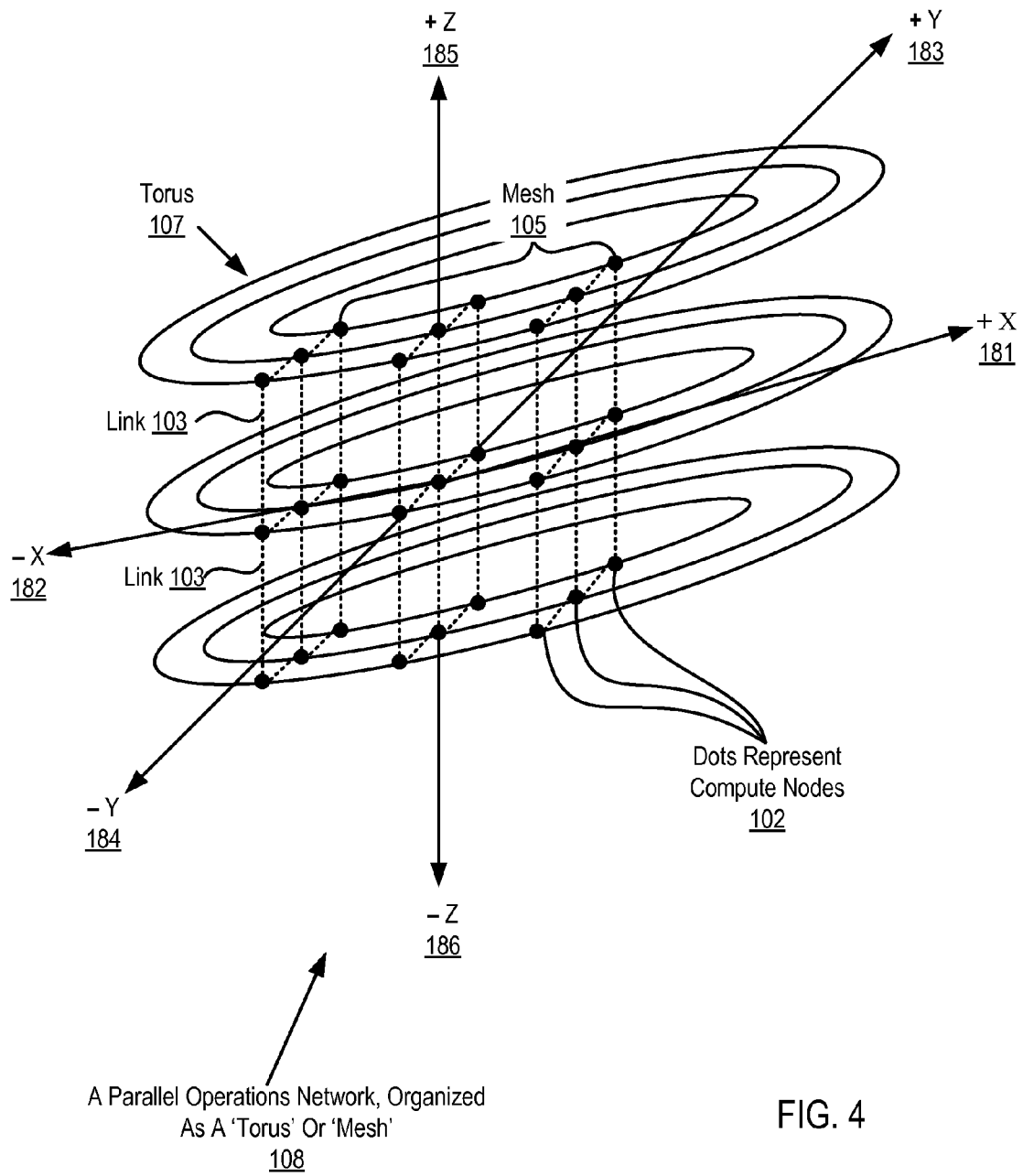
FIG. 4 sets forth a line drawing illustrating an exemplary data communications network optimized for point to point operations useful in systems capable of reducing power consumption while synchronizing a plurality of compute nodes during execution of a parallel application in accordance with embodiments of the present invention.

For further explanation, FIG. 4 sets forth a line drawing illustrating an exemplary data communications network (108) optimized for point to point operations useful in systems capable of reducing power consumption while synchronizing a plurality of compute nodes during execution of a parallel application in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in reducing power consumption while synchronizing a plurality of compute nodes during execution of a parallel application in accordance with embodiments of the present invention may contain only a few compute nodes or may contain thousands of compute nodes.

Figure 5:
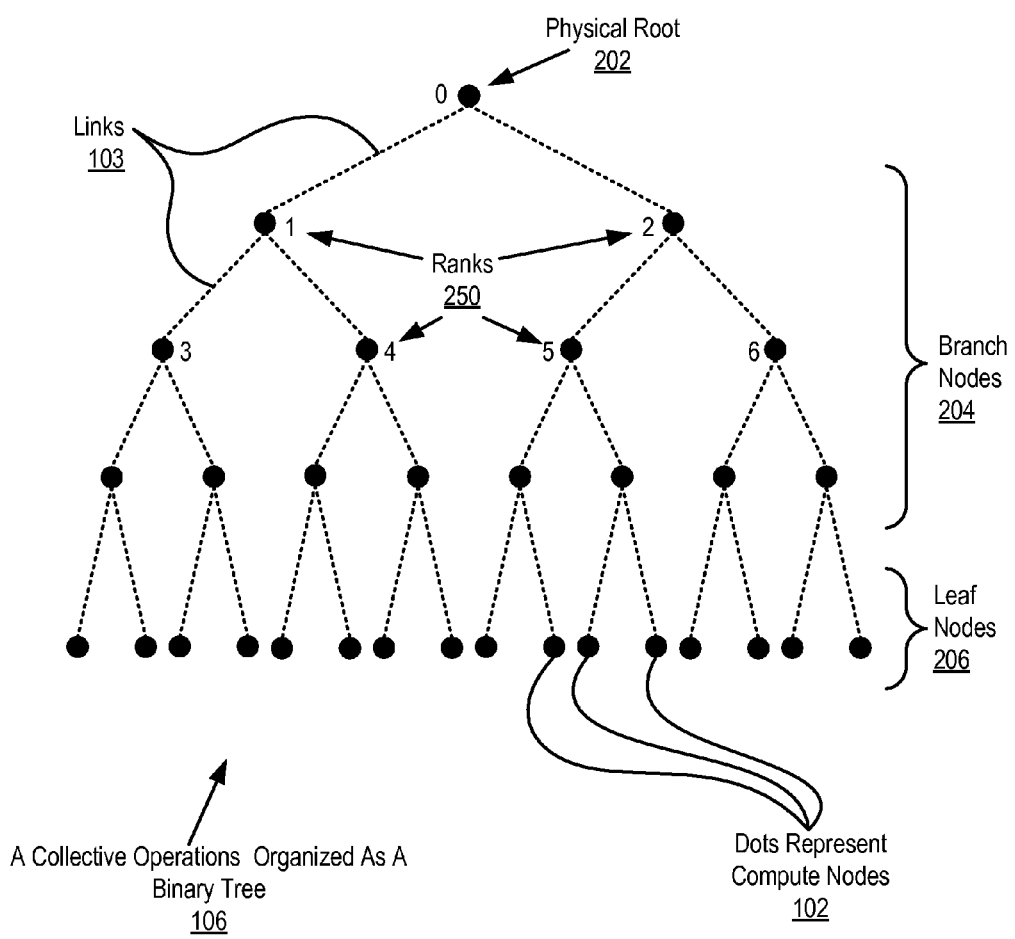
FIG. 5 sets forth a line drawing illustrating an exemplary data communications network optimized for collective operations useful in systems capable of reducing power consumption while synchronizing a plurality of compute nodes during execution of a parallel application in accordance with embodiments of the present invention.

For further explanation, FIG. 5 sets forth a line drawing illustrating an exemplary data communications network (106) optimized for collective operations useful in systems capable of reducing power consumption while synchronizing a plurality of compute nodes during execution of a parallel application in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for reducing power consumption while synchronizing a plurality of compute nodes during execution of a parallel application in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
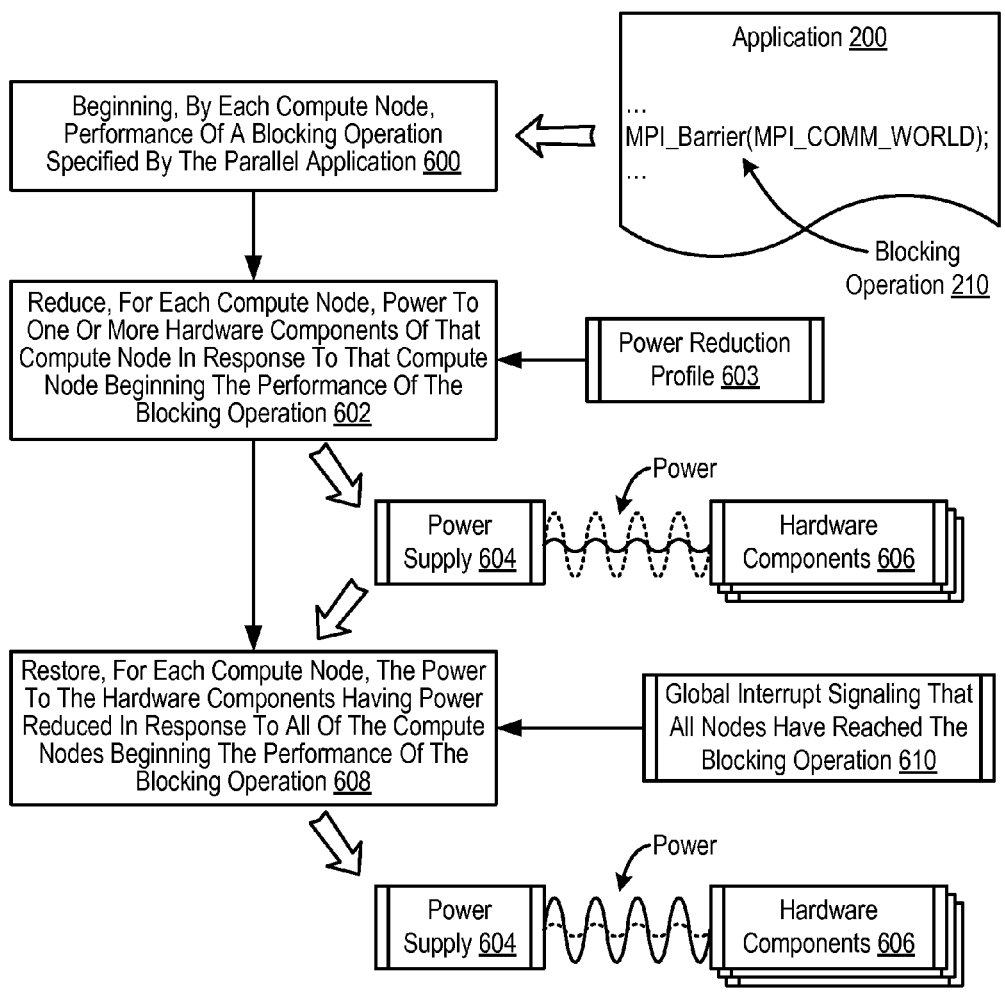
FIG. 6 sets forth a flow chart illustrating an exemplary method for reducing power consumption while synchronizing a plurality of compute nodes during execution of a parallel application according to embodiments of the present invention.

For further explanation, FIG. 6 sets forth a flow chart illustrating an exemplary method for reducing power consumption while synchronizing a plurality of compute nodes during execution of a parallel application (200) according to embodiments of the present invention. The parallel computer described with referenced to FIG. 6 includes a plurality of compute nodes connected together through a data communications network. The application (200) of FIG. 6 specifies a blocking operation (210) for execution on the compute nodes. As mentioned above, a blocking operation is an operation that prevents the compute nodes from executing the application beyond a particular point of the application's execution sequence until criteria specified by the blocking operation is satisfied.

In the example of FIG. 6, the blocking operation (210) is implemented as a barrier operation. A barrier operation is an operation that prevents a particular compute node from executing the application (200) beyond a particular point of the application's execution sequence until all of the other compute nodes executing the application having reached the same point in the execution sequence of the application. The exemplary barrier operation illustrated in FIG. 6 is an MPI_BARRIER operation described in the MPI specification, which is promulgated by the MPI Forum.

The method of FIG. 6 includes beginning (600), by each compute node, performance of a blocking operation (210) specified by the parallel application (200). Each compute node may begin (600) performance of a blocking operation (210) specified by the parallel application (200) according to the method of FIG. 6 by encountering the blocking operation (210) during the execution sequence for the application (200) and scheduling the computer program instructions that make up the blocking operation (210) for execution on that compute node's processor.

In the example of FIG. 6, each compute node begins (600) the blocking operation (210) asynchronously with respect to the other compute nodes. That is, because each compute node executes an instance of the application (200) and because the compute nodes may process the application (200) at different speeds, some compute nodes arrive at the blocking operation (210) in the application's execution sequence before other compute nodes.

The method of FIG. 6 also includes reducing (602), for each compute node, power to one or more hardware components (606) of that compute node in response to that compute node beginning (600) the performance of the blocking operation (210). The hardware components (606) of FIG. 6 may include processors, memory modules, bus adapters, bus circuitry, DMA controllers, computing environment sensors, or any other hardware components as will occur to those of skill in the art. Each compute node may reduce (602) power to one or more hardware components (606) of that compute node according to the method of FIG. 6 by instructing the compute node's processor or a service processor to reduce power to the hardware components (606) according to power reduction profile (603) established for the particular blocking operation (210). The power reduction profile (603) of FIG. 6 specifies the particular hardware components of the compute node for which power may be reduced for a particular blocking operation. In addition, the power reduction profile (603) of FIG. 6 may specify the manner in which power may be reduced for the particular hardware components. In such a manner, the power reduction profile (603) of FIG. 6 provides the ability to have different power reductions measures for different blocking operations. For example, during an I/O operation, a compute node's memory modules are typically accessed to store or retrieve data received from the network, while during a barrier operation those memory modules are generally inactive. The power reduction profile (603) of FIG. 6 may therefore instruct the compute node to throttle the operating speed of the memory module during a barrier operation to reduce power while leaving power to the memory modules unchanged during an I/O operation.

For exemplary purposes only, FIG. 6 illustrates the reduction in power to the various hardware components (606) as a reduction in the amplitude of a sinusoidal wave from a power supply (604) to the hardware components (606). The sinusoidal wave represents the power transferred between the power supply (604) and the hardware components (606) in an alternating current ('A/C') circuit. The dotted-line sinusoidal wave represents the amplitude of the power before the power reduction occurs, while the solid-line sinusoidal wave represents the amplitude of the power after the power reduction occurs. Readers will note that representing the power transferred between the power supply (604) and the hardware components (606) as a sinusoidal wave of an A/C circuit is for example only. The shape of the wave may take many forms such as, for example, step wave, saw tooth wave, triangular wave, and so on. Because the power supply (604) may provide power in a direct current ('D/C') circuit, the power may be implemented as a wave of constant amplitude or pulses of constant amplitude.

Each compute node may reduce (602) power to one or more hardware components (606) of that compute node according to the method of FIG. 6 by powering down hardware components of that compute node not utilized to perform the blocking operation. For example, during a barrier operation or I/O operation that does not utilize the torus network optimized for point to point data communications, the compute node may power down the torus network adapter. In some embodiments, each compute node may reduce (602) power to one or more hardware components (606) of that compute node according to the method of FIG. 6 by pulsing power to the hardware components (606) or decreasing the power delivered to the hardware components (606) during the current power pulses. The current delivered during the current power pulses may be decreased by increase the time between pulses or reducing the duration of each power pulse.

In addition, each compute node may reduce (602) power to one or more hardware components (606) of that compute node according to the method of FIG. 6 by throttling operating speeds for hardware components of that compute node both utilized and not utilized to perform the blocking operation because throttling operating speeds for a hardware component generally reduces power consumed by a hardware component. Each compute node may throttle these hardware components (606) by writing a lower value to the registers in the hardware components (606) that control the operating frequency for those components (606).

The method of FIG. 6 also includes restoring (608), for each compute node, the power to the hardware components (606) having power reduced in response to all of the compute nodes beginning (600) the performance of the blocking operation (210). Typically each compute node receives a notification message, often in the form of a global interrupt (610), that informs each compute node that all of the compute nodes processing the application (200) have reached in the blocking operation (210) in the application's execution sequence. The precise point during the application's execution sequence at which power is restored to the hardware components (606) may vary from one embodiment to another. The earliest point in the execution sequence at which power is restored is generally the point at which all of the compute nodes have begun (600) the performance of the blocking operation (210). At that point, all of the compute nodes are typically synchronized and are ready to process the next section of the application (200) in the application's execution sequence. In some embodiments, however, the point in the execution sequence at which power is restored may be a point after the point at which all of the compute nodes have begun (600) the performance of the blocking operation (210) such as, for example, the point at which all of the compute nodes have completed the performance of the blocking operation (210). The manner in which each compute node restores (608) the power to the hardware components (606) typically varies depending on the manner in which power was reduced to the component (606). For example, when power is reduced by powering down the component (606), then power is restored by powering on the same component (606). When power is reduced by throttling the operating speed of the component (606), then power is restored by increase the operating speed of the same component (606). For exemplary purposes only, FIG. 6 illustrates the restoration in power to the various hardware components (606) as an increase in the amplitude of a sinusoidal wave from a power supply (604) to the hardware components (606). The dotted-line sinusoidal wave represents the amplitude of the power before the power restoration occurs, while the solid-line sinusoidal wave represents the amplitude of the power after the power restoration occurs.

Because often the compute nodes are connected together using more than one data communications networks, the network hardware for the networks not used during the blocking operation may be turned off to conserve power. For further explanation, FIG. 7 sets forth a flow chart illustrating a further exemplary method for reducing power consumption while synchronizing a plurality of compute nodes during execution of a parallel application according to embodiments of the present invention. The parallel computer described with referenced to FIG. 7 includes a plurality of compute nodes connected together through a plurality of data communications networks. At least one of the data communications networks is optimized for point to point operations, and at least one of the data communications networks is optimized for collective operations. The application (200) of FIG. 7 specifies a blocking operation (210) for execution on the compute nodes.

Figure 7:
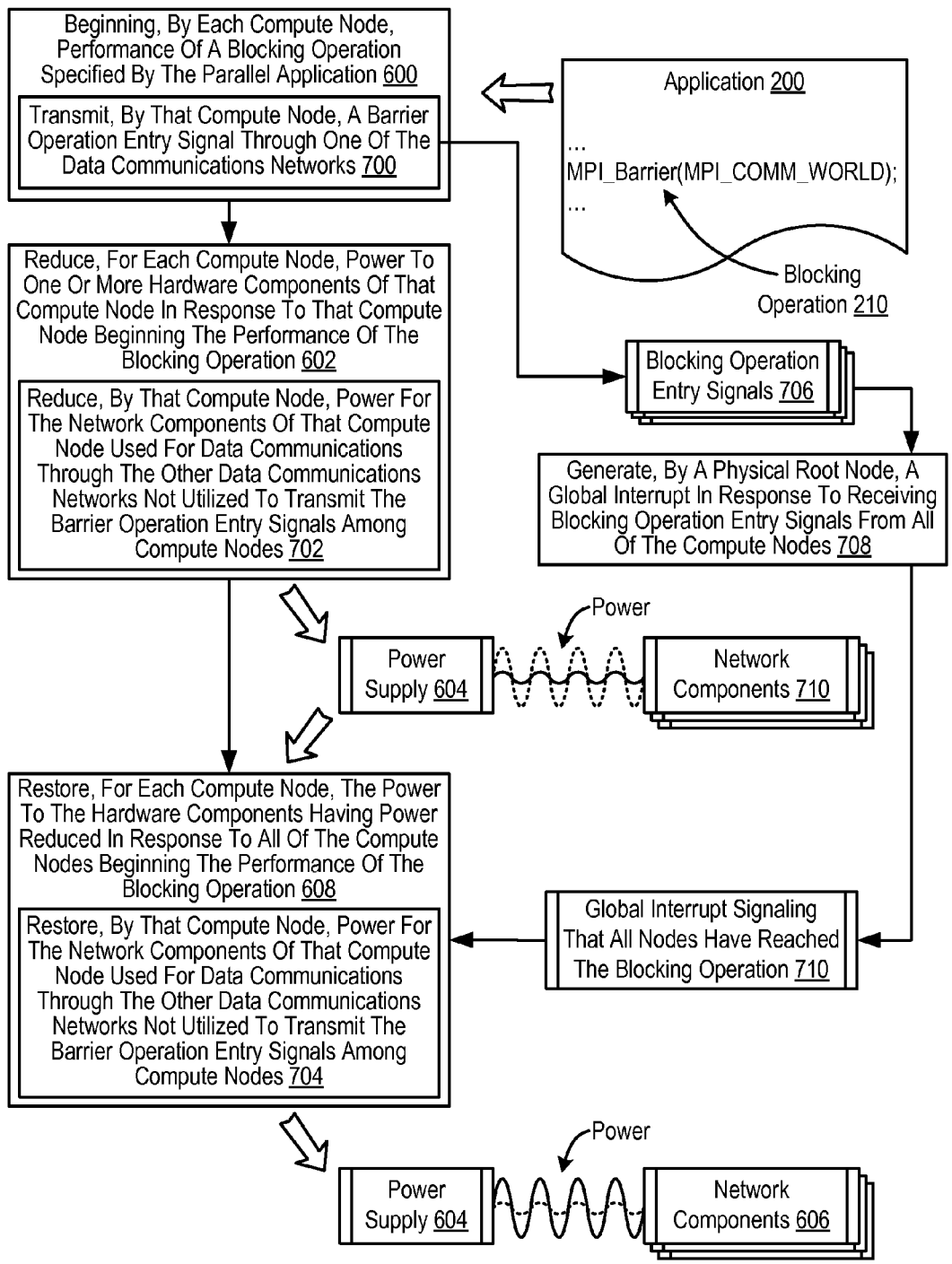
FIG. 7 sets forth a flow chart illustrating a further exemplary method for reducing power consumption while synchronizing a plurality of compute nodes during execution of a parallel application according to embodiments of the present invention.

The method of FIG. 7 is similar to the method of FIG. 6. That is, the method of FIG. 7 includes: beginning (600), by each compute node, performance of a blocking operation (210) specified by the parallel application (200), each compute node beginning the blocking operation (210) asynchronously with respect to the other compute nodes; reducing (602), for each compute node, power to one or more hardware components of that compute node in response to that compute node beginning (600) the performance of the blocking operation (210); and restoring (608), for each compute node, the power to the hardware components having power reduced in response to all of the compute nodes beginning (600) the performance of the blocking operation.

In the method of FIG. 7, however, beginning (600), by each compute node, performance of a blocking operation (210) specified by the parallel application (200) includes transmitting (700), by that compute node, a blocking operation entry signal (706) through one of the plurality of data communications networks. The blocking operation entry signal (706) of FIG. 7 indicates that the compute node has reached the blocking operation (210) in the execution sequence of the application (200) on a particular compute node. The blocking operation entry signal (706) may be implemented as a control packet, interrupt signal, messaging layer message, or any other signal as will occur to those of skill in the art. Each compute node may transmit (700) a blocking operation entry signal (706) through one of the plurality of data communications networks according to the method of FIG. 7 by sending, through the tree network optimized for collective operations, the blocking operation entry signal (706) to the physical root of the operational group processing the application (200).

The method of FIG. 7 includes generating (708), by the physical root node, a global interrupt (710) in response to receiving blocking operation entry signals (706) from all of the compute nodes. The global interrupt (710) of FIG. 7 signals that all of the compute nodes have reached the blocking operation (710). The physical root node may generate (708) the global interrupt (710) according to the method of FIG. 7 by setting a counter value to the number of nodes processing the application (200), decrementing the counter for each blocking operation entry signal (706) received, and multicasting a global interrupt (710) down the tree network to all of the compute nodes processing the application (200) when the counter value reaches zero.

In the method of FIG. 7, reducing (602), for each compute node, power to one or more hardware components of that compute node in response to that compute node beginning (600) the performance of the blocking operation (210) includes reducing (702), by that compute node, power for the network components (710) of that compute node used for data communications through the other data communications networks not utilized to transmit the blocking operation entry signals (706) among compute nodes. In such a manner, power is reduced to the network components (710) of a compute node that are not utilized to perform the blocking operation or restore power when the blocking operation is reached in the application's execution sequence. The network components (710) of FIG. 7 may be implemented as network adapters, DMA hardware, network registers, and so on. Each compute node may reduce (702) power for the network components (710) of that compute node according to the method of FIG. 7 in a manner similar to the manner in which power is reduce to the other hardware components described above with reference to FIG. 6.

In a manner similar to FIG. 6, for exemplary purposes only, FIG. 7 illustrates the reduction in power to the various network components (710) as a reduction in the amplitude of a sinusoidal wave from a power supply (604) to the network components (710). The sinusoidal wave represents the power transferred between the power supply (604) and the network components (710) in an alternating current ('A/C') circuit. The dotted-line sinusoidal wave represents the amplitude of the power before the power reduction occurs, while the solid-line sinusoidal wave represents the amplitude of the power after the power reduction occurs. Readers will note that representing the power transferred between the power supply (604) and the network components (710) as a sinusoidal wave of an A/C circuit is for example only. The shape of the wave may take many forms such as, for example, step wave, saw tooth wave, triangular wave, and so on. Because the power supply (604) may provide power in a direct current ('D/C') circuit, the power may be implemented as a wave of constant amplitude or pulses of constant amplitude.

In the method of FIG. 7, restoring (608), for each compute node, the power to the hardware components having power reduced in response to all of the compute nodes beginning (600) the performance of the blocking operation includes restoring (704), by that compute node, power for the network components (710) of that compute node used for data communications through the other data communications networks not utilized to transmit the blocking operation entry signals (706) among compute nodes. Each compute node may restore (704) power for the network components (710) of that compute node used for data communications through the other data communications networks not utilized to transmit the blocking operation entry signals (706) among compute nodes according to the method of FIG. 7 in a manner similar to the manner in which power is restored to the other hardware components as described above with reference to FIG. 6. For exemplary purposes only, FIG. 7 illustrates the restoration in power to the various network components (710) as an increase in the amplitude of a sinusoidal wave from a power supply (604) to the network components (710). The dotted-line sinusoidal wave represents the amplitude of the power before the power restoration occurs, while the solid-line sinusoidal wave represents the amplitude of the power after the power restoration occurs.

Exemplary embodiments of the present invention are described largely in the context of a fully functional computer system for reducing power consumption while synchronizing a plurality of compute nodes during execution of a parallel application. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing power consumption while synchronizing a plurality of compute nodes during execution of a parallel application, the method comprising:
    beginning, by each compute node, performance of a blocking operation specified by the parallel application, each compute node beginning the blocking operation asynchronously with respect to the other compute nodes;
    reducing, for each compute node, power to one or more hardware components of that compute node in response to that compute node beginning the performance of the blocking operation; and
    restoring, for each compute node, the power to the hardware components having power reduced in response to all of the compute nodes beginning the performance of the blocking operation.

2. The method of claim 1 wherein reducing power to one or more hardware components of that compute node further comprises powering down the hardware components of that compute node not utilized to perform the blocking operation.

3. The method of claim 1 wherein reducing power to one or more hardware components of that compute node further comprises throttling operating speeds for the hardware components of that compute node not utilized to perform the blocking operation.

4. The method of claim 1 wherein reducing power to one or more hardware components of that compute node further comprises throttling operating speeds for the hardware components of that compute node that are utilized to perform the blocking operation.

5. The method of claim 1 wherein the plurality of compute nodes are connected together for data communications through a plurality of data communications networks, at least one of the data communications networks optimized for point to point operations, at least one of the data communications networks optimized for collective operations.

6. The method of claim 5 wherein:
    beginning, by each compute node, performance of a blocking operation specified by the parallel application further comprises transmitting, by that compute node, a blocking operation entry signal through one of the plurality of data communications networks;
    reducing, by each compute node, power to one or more hardware components of that compute node in response to beginning the performance of the blocking operation further comprises reducing, by that compute node, power for the network components of that compute node used for data communications through the other data communications networks not utilized to transmit the blocking operation entry signals among compute nodes; and
    restoring, by each compute node, the power to the hardware components having power reduced in response to all of the compute nodes beginning the performance of the blocking operation further comprises restoring, by that compute node, power for the network components of that compute node used for data communications through the other data communications networks not utilized to transmit the blocking operation entry signals among compute nodes.

7. A parallel computer capable of reducing power consumption while synchronizing a plurality of compute nodes during execution of a parallel application, the parallel computer comprising a plurality of computer processors and computer memory operatively coupled to the computer processors, the computer memory having disposed within it computer program instructions capable of:
    beginning, by each compute node, performance of a blocking operation specified by the parallel application, each compute node beginning the blocking operation asynchronously with respect to the other compute nodes;
    reducing, for each compute node, power to one or more hardware components of that compute node in response to that compute node beginning the performance of the blocking operation; and
    restoring, for each compute node, the power to the hardware components having power reduced in response to all of the compute nodes beginning the performance of the blocking operation.

8. The parallel computer of claim 7 wherein reducing power to one or more hardware components of that compute node further comprises powering down the hardware components of that compute node not utilized to perform the blocking operation.

9. The parallel computer of claim 7 wherein reducing power to one or more hardware components of that compute node further comprises throttling operating speeds for the hardware components of that compute node not utilized to perform the blocking operation.

10. The parallel computer of claim 7 wherein reducing power to one or more hardware components of that compute node further comprises throttling operating speeds for the hardware components of that compute node that are utilized to perform the blocking operation.

11. The parallel computer of claim 7 wherein the plurality of compute nodes are connected together for data communications through a plurality of data communications networks, at least one of the data communications networks optimized for point to point operations, at least one of the data communications networks optimized for collective operations.

12. The parallel computer of claim 11 wherein:
beginning, by each compute node, performance of a blocking operation specified by the parallel application further comprises transmitting, by that compute node, a blocking operation entry signal through one of the plurality of data communications networks;
reducing, by each compute node, power to one or more hardware components of that compute node in response to beginning the performance of the blocking operation further comprises reducing, by that compute node, power for the network components of that compute node used for data communications through the other data communications networks not utilized to transmit the blocking operation entry signals among compute nodes; and
restoring, by each compute node, the power to the hardware components having power reduced in response to all of the compute nodes beginning the performance of the blocking operation further comprises restoring, by that compute node, power for the network components of that compute node used for data communications through the other data communications networks not utilized to transmit the blocking operation entry signals among compute nodes.

13. A computer program product for reducing power consumption while synchronizing a plurality of compute nodes during execution of a parallel application, the computer program product disposed upon a computer readable medium, the computer program product comprising computer program instructions capable of:
beginning, by each compute node, performance of a blocking operation specified by the parallel application, each compute node beginning the blocking operation asynchronously with respect to the other compute nodes;
reducing, for each compute node, power to one or more hardware components of that compute node in response to that compute node beginning the performance of the blocking operation; and
restoring, for each compute node, the power to the hardware components having power reduced in response to all of the compute nodes beginning the performance of the blocking operation.

14. The computer program product of claim 13 wherein reducing power to one or more hardware components of that compute node further comprises powering down the hardware components of that compute node not utilized to perform the blocking operation.

15. The computer program product of claim 13 wherein reducing power to one or more hardware components of that compute node further comprises throttling operating speeds for the hardware components of that compute node not utilized to perform the blocking operation.

16. The computer program product of claim 13 wherein reducing power to one or more hardware components of that compute node further comprises throttling operating speeds for the hardware components of that compute node that are utilized to perform the blocking operation.

17. The computer program product of claim 13 wherein the plurality of compute nodes are connected together for data communications through a plurality of data communications networks, at least one of the data communications networks optimized for point to point operations, at least one of the data communications networks optimized for collective operations.

18. The computer program product of claim 17 wherein:
beginning, by each compute node, performance of a blocking operation specified by the parallel application further comprises transmitting, by that compute node, a blocking operation entry signal through one of the plurality of data communications networks;
reducing, by each compute node, power to one or more hardware components of that compute node in response to beginning the performance of the blocking operation further comprises reducing, by that compute node, power for the network components of that compute node used for data communications through the other data communications networks not utilized to transmit the blocking operation entry signals among compute nodes; and
restoring, by each compute node, the power to the hardware components having power reduced in response to all of the compute nodes beginning the performance of the blocking operation further comprises restoring, by that compute node, power for the network components of that compute node used for data communications through the other data communications networks not utilized to transmit the blocking operation entry signals among compute nodes.

19. The computer program product of claim 13 wherein the computer readable medium comprises a recordable medium.

20. The computer program product of claim 13 wherein the computer readable medium comprises a transmission medium.

* * * * *

UNITED STATES PATENT AND TRADEMARK OFFICE
CERTIFICATE OF CORRECTION

PATENT NO.       : 8,095,811 B2
APPLICATION NO.  : 12/129223
DATED            : January 10, 2012
INVENTOR(S)      : Charles J. Archer et al.

It is certified that error appears in the above-identified patent and that said Letters Patent is hereby corrected as shown below:

on the title page, item (75) error on inventor name -
"Amanda A. Peters" should be --Amanda E. Peters--

Signed and Sealed this
Thirteenth Day of March, 2012

David J. Kappos
*Director of the United States Patent and Trademark Office*